United States Patent
Ricco et al.

(10) Patent No.: US 7,069,917 B2
(45) Date of Patent: Jul. 4, 2006

(54) GAS FEEDING SYSTEM FOR AN INTERNAL COMBUSTION ENGINE, HAVING A PRESSURE REDUCING VALVE AND A PRESSURE REGULATING SOLENOID VALVE

(75) Inventors: Mario Ricco, Orbassano (IT); Sisto Luigi De Matthaeis, Orbassano (IT); Claudio Amorese, Orbassano (IT); Dario Manodoro, Orbassano (IT); Raffaele Ricco, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 11/054,561

(22) Filed: Feb. 10, 2005

(65) Prior Publication Data
US 2005/0241625 A1 Nov. 3, 2005

(30) Foreign Application Priority Data
May 3, 2004 (EP) .................................. 04425309

(51) Int. Cl.
*F02M 37/04* (2006.01)

(52) U.S. Cl. .................................................. 123/527
(58) Field of Classification Search ................ 123/527, 123/525, 529
See application file for complete search history.

(56) References Cited

U.S. PATENT DOCUMENTS

| 4,597,364 | A | 7/1986 | Young |
| 6,267,105 | B1 | 7/2001 | Bertossi |
| 6,578,560 | B1 * | 6/2003 | Ricco .......................... 123/527 |

FOREIGN PATENT DOCUMENTS

| EP | 0 420 599 | 4/1991 |
| EP | 0 863 300 | 9/1998 |
| EP | 0 894 968 | 2/1999 |
| EP | 0 964 145 | 12/1999 |
| EP | 1 209 336 | 5/2002 |
| WO | WO 95/04213 | 2/1995 |

\* cited by examiner

*Primary Examiner*—Stephen K. Cronin
*Assistant Examiner*—Hyder Ali
(74) *Attorney, Agent, or Firm*—Nixon & Vanderhye P.C.

(57) ABSTRACT

In a gas-supply system for internal-combustion engines, a pressure-reducing valve is set between the reservoir of the gas and a distribution manifold or rail that feeds the gas to a series of electromagnetically controlled injectors associated to the various cylinders of the engine. The reduced pressure supplied by the pressure-reducing valve is further reduced via a pressure-regulating solenoid valve, to an extent that depends upon the supply current of its solenoid. The electrical supply to the solenoid of said solenoid valve is controlled by an electronic control unit according to the signal issued by a sensor of the pressure in the rail and according to stored maps, which supply the optimal pressure value for each operating condition of the engine.

1 Claim, 8 Drawing Sheets

GAS FEEDING SYSTEM FOR AN INTERNAL COMBUSTION ENGINE, HAVING A PRESSURE REDUCING VALVE AND A PRESSURE REGULATING SOLENOID VALVE

BACKGROUND OF THE OF THE INVENTION

1. Field of the Invention

The present invention relates to systems for supplying gas, in particular compressed natural gas, such as for example methane, for internal-combustion engines, of the type comprising:
- a plurality of electromagnetically controlled injectors, associated to the various cylinders;
- a distribution manifold or rail communicating is with said injectors;
- a reservoir for supply of the rail, where pressurized gas is accumulated; and
- a pressure-reducing valve set in connection between the-reservoir and the aforesaid rail.

2. Prior Art

A supply system of the known type referred to above is illustrated in FIG. 1 of the annexed plate of drawings. In said figure, the reference number 1 designates the electromagnetically controlled injectors associated to the various cylinders of the engine, which are supplied with pressurized gas by a distribution manifold or rail 2. The reference number 3 designates a gas cylinder, which functions as a reservoir, in which pressurized gas, for example methane, is accumulated. The outlet of the gas cylinder 3 is connected via a pipe 4 to the rail 2. Set in series in the pipe 4 are: a safety valve 5, constituted by a solenoid shutoff valve designed to block the outlet of the gas cylinder 3; a pressure sensor 6; and a pressure-reducing valve 7. The reference number 8 designates a sensor of the pressure in the rail or distribution manifold 2.

In the case, for example, of a methane supply system, the initial pressure of the methane inside the gas cylinder 3, when the latter is full, is in the region of 200 bar. Said pressure of course drops as the gas cylinder 3 empties, until a minimum value in the region of 20 bar is reached.

At the same time, the electromagnetically controlled injectors 1 are able to operate at sensibly lower gas pressures, normally lower than 10 bar. The purpose of the valve 7 is precisely to bring the pressure of the gas to a suitable value for proper operation of the injectors 1. In the practical case, currently used pressure-reducing valves bring the pressure of the gas in the pipe 9 downstream of the pressure-reducing valve 6, which takes the gas to the rail 2, to a pressure value which oscillates (as the pressure of the gas coming from the pipe 4 varies) between approximately 6.3 bar and 8.5 bar.

The present invention relates, in particular, to systems for supplying gas of the type illustrated above, in which the pressure-reducing valve comprises:
- a valve body, with an inlet connector connected to the reservoir and an outlet connector connected to the rail;
- a restricted passage defined inside the valve body for communication between the aforesaid inlet connector and the aforesaid outlet connector;
- an open/close element for control of the communication through said restricted passage;
- means for return of the open/close element tending to keep the open/close element in an open condition; and
- a piston member, movable inside the valve body, for controlling said open/close element, said piston member being subject to the pressure of the gas downstream of the aforesaid restricted passage.

FIG. 2 of the annexed plate of drawings illustrates a pressure-reducing valve of a known type used in supply systems of the type referred to above. The example illustrated relates to the case of a valve that provides two successive stages of pressure reduction set in cascaded fashion. The body of the valve is designated by the reference number 10. The number 11 designates the inlet connector, designed to be connected to the pipe (FIG. 1) through which the gas coming from the reservoir under pressure 3 flows, whilst the reference number 12 designates the outlet opening, in which there is designed to be mounted the connector for connection to the pipe 9 that takes the gas at reduced pressure to the rail 2 (FIG. 1). The connector 11 defines an inlet passage 13 that communicates with the outlet 12 through a series of passages made inside the body 10, as will be defined further in what follows. Set in said series of passages is a restricted passage 14 associated to the first stage of the valve. The gas that enters the valve through the inlet passage 13 arrives at the restricted passage 14 passing through a filter 15 and an electromagnetically controlled safety shutoff valve. The solenoid valve 16 comprises a solenoid 17 that is able to recall an anchor 18 into a retracted position, in which an open/close shutoff element 19 is disengaged from a respective valve seat, leaving a passage 20 that converges into the restricted passage 14 free. The restricted passage 14 gives out onto a spherical surface, functioning as valve seat, which co-operates at the front with an open/close element 21 constituted by a seal element mounted at a free end of a stem 22 of a piston member 23. The latter has a bottom head (as viewed in FIG. 2) of widened diameter, which is slidably mounted, with the interposition of a seal gasket 24, within a cylindrical liner 25 fixed to the body of the valve. A helical spring 26 is set between the bottom head of the piston member 23 and a fixed cup 27. The spring 26 tends to keep the piston member 23 in its end-of-travel position downwards (illustrated in the drawing), in which the bottom head of the piston element 23 is in contact with a bottom element 28 for closing the cylinder liner 25 and in which the open/close element 21 is set at a distance from the outlet of the restricted passage 14, so that in said condition the gas that arrives at the restricted passage 14 from the inlet passage 13 can pass into a chamber 29 that is set downstream of the restricted passage 14, after undergoing a consequent pressure drop. From the chamber 29, the gas flows via an intermediate passage 30 to a second stage of the valve, which is identical to what has been described above from a functional standpoint, via which the gas finally reaches the outlet opening 12. In what follows, said second stage of the valve will not be further illustrated, since it corresponds, as has been said, to the first stage. To return now to the structure and to the operation of the first stage of the pressure-reducing valve, the gas that arrives in the chamber 29, in addition to flowing towards the outlet through the passage 30, also reaches a chamber 31 facing the opposite end of the piston member 23 via an axial passage 32 made through the piston member 22 and through radial holes provided in the wall of the stem of the piston member. The chamber 33, in which the spring 26 is set, is in communication with the external atmosphere through holes 25a provided in the wall of the cylinder liner 25. Consequently, the seal gasket 24 performs the function of preventing the gas present in the chamber 31 from being able to leak into the chamber 33 and from there come out into the external atmosphere. A similar function is performed by a seal gasket 34 provided in a position corresponding to a central hole of the fixed cup 27 functioning as guide for the sliding movement of the stem 22 of the piston member 23. Also said gasket in fact prevents the gas present in the chamber 14 from possibly passing into the chamber 33 and from there into the external atmosphere. The seal gaskets 24 and 34 are designed obviously taking into account the fact that they are set between surfaces in relative movement, i.e., they are gaskets of a dynamic type. Static gaskets 35, 36, constituted by seal rings made of elastomeric material, are instead set between the closing element 28 and the bottom end of the cylinder liner 25 and between the fixed cup 27 and the body of the valve.

In operation, the gas coming from the inlet passage 13 passes initially straight into the chamber 29 through the restricted passage 14, undergoing a pressure reduction through the solenoid valve 16 in its initial opening phase, and is thus sent at reduced pressure to the passage 30, from which it passes to a second pressure-reducing stage, or directly to the outlet of the valve (in the case of the valve being a single-stage one). As the pressure in the chamber 29 increases, however, said pressure is also communicated to the chamber 31 located at the opposite end of the piston member 23. On account of the greater effective area at the surface of the head of the piston member 23 facing the chamber 31, when the pressure in the chamber 31 reaches the calibration pressure value, i.e., the reduction pressure of the first stage, the pressure of the chamber 31 tends to bring about raising (as viewed in the drawing) of the piston member 23 against the action of the spring 26 until it brings about closing of the open/close element 21 against its seat. The open/close element thus remains closed until the pressure in the chamber 29, and consequently in the chamber 31, drops back to a value such that the spring causes opening of the open/close element. There is thus brought about a continuous oscillation of the open/close element between the open condition and the closed condition, which keeps the pressure in the pipe 30 downstream of the first reduction stage within a required range of values. As has already been said, the operation described above is repeated a second time at the second stage of the valve, in the case where the valve is a dual-stage one, as in the example illustrated in the figure, whilst the gas that arrives at the pipe 30 is sent directly to the rail in the case of a single-stage valve.

Drawbacks of the Prior Art

In the known valves of the type described above, it is necessary for the dynamics of variation of the regulated pressure not to exceed ±10%, in order to guarantee proper operation of the injection system. With reference to FIG. 1 of the annexed plate of drawings, the pressure sensor 8 sensitive to the pressure in the rail 2 sends its signal to an electronic control unit C, which receives also the output signal from the pressure sensor 6 set immediately downstream of the reservoir 3, and controls the injectors 1 and in particular their opening time according to the supply pressure.

In order to limit the sensitivity of the regulated pressure to the pressure of the reservoir and to the flow rate, it is consequently necessary to adopt, in the valve 10 illustrated in FIG. 2, a spring 26 of high load, which accordingly has a large size. This entails the adoption of the geometry illustrated in FIG. 2, with the consequent need to provide two seal gaskets 24, 34 of a dynamic type. It should also be noted that the structure of the cylinder liner 25, within which the piston member 23 is slidably mounted, is at times subject to deformations following upon tightening of the screws 37, which fix the closing element 28 and the cylinder liner 25 to the body of the valve. Possible deformations of the structure increase the risk of leakage of gas towards the outside. Of course, in the case of a dual-stage valve, the aforesaid drawbacks are twice as many.

Basically then, the valve of a known type proves cumbersome, not altogether reliable with respect to the risk of leakage of gas into the external atmosphere, and finally also has a relatively complicated and costly structure. In addition to this, the valve described above does not enable an optimal response during the transient regimes. There is finally the risk of a deterioration of the load of the spring over time, with consequent variation of the regulated pressure.

PURPOSE OF THE INVENTION

The purpose underlying the present invention is to provide a supply system of the known type described above which will enable the drawbacks referred to above to be overcome, which, more in general, will have a relatively simple and low-cost structure, which, notwithstanding this, will guarantee an operation that is efficient and reliable, and which will moreover be safer as regards the risk of leakage of gas into the external atmosphere.

In particular, a purpose of the invention is to provide a system of the type specified above which will be able to implement efficient regulation of the pressure in the distribution rail in order to adapt said pressure as required to the operating conditions of the engine.

THE INVENTION

With a view to achieving the above and further purposes, the subject of the invention is a gas-supply system for an internal-combustion engine having all the characteristics that are specified in claim 1. Further preferred characteristics of the system according to the invention form the subject of the dependent claims.

BRIEF DESCRIPTION OF THE FIGURES

Further characteristics and advantages of the invention will emerge from the ensuing description with reference to the annexed plate of drawings, which are provided purely by way of non-limiting example, and in which.

DETAILED DESCRIPTION OF SOME PREFERRED EMBODIMENTS OF THE INVENTION

Figure 2:
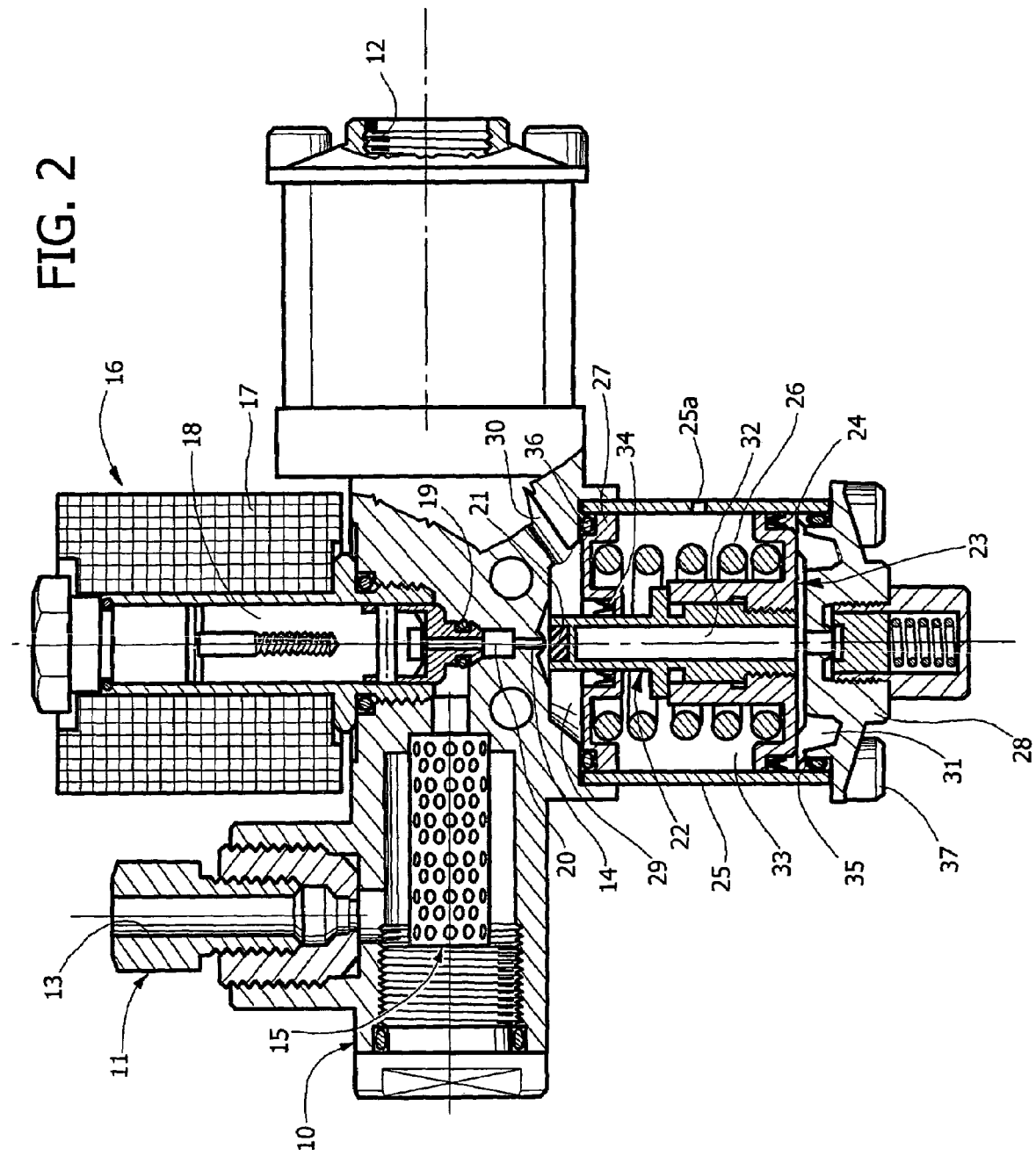
FIG. 2 is a partially sectioned view, already described, of a pressure-reducing valve according to the known art.
Figure 3:
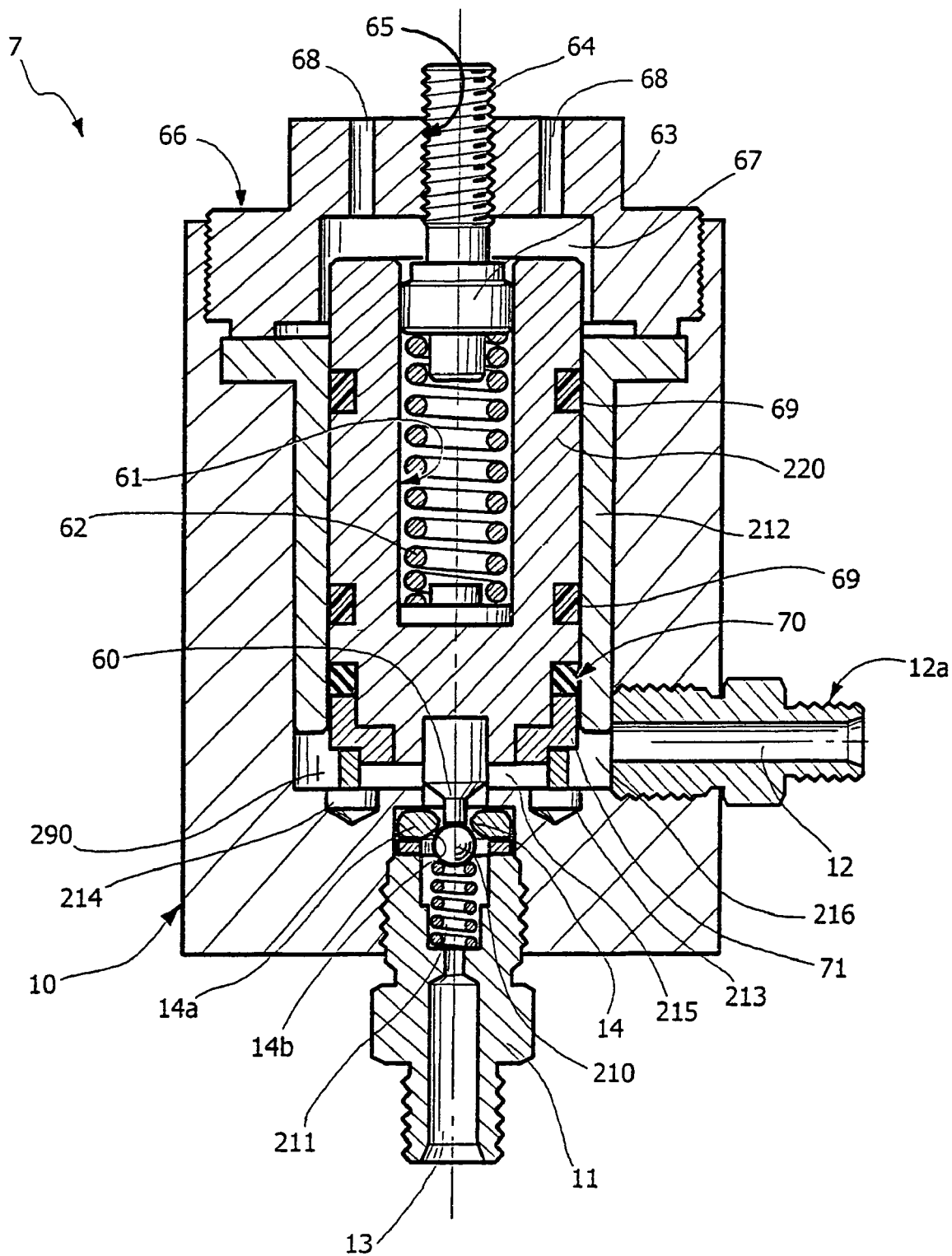
FIG. 3 is a cross-sectional view of an example of embodiment of a pressure-reducing valve that does not form part of the present invention and that forms the subject of a co-pending patent application filed in the name of the present applicant.
Figure 4:
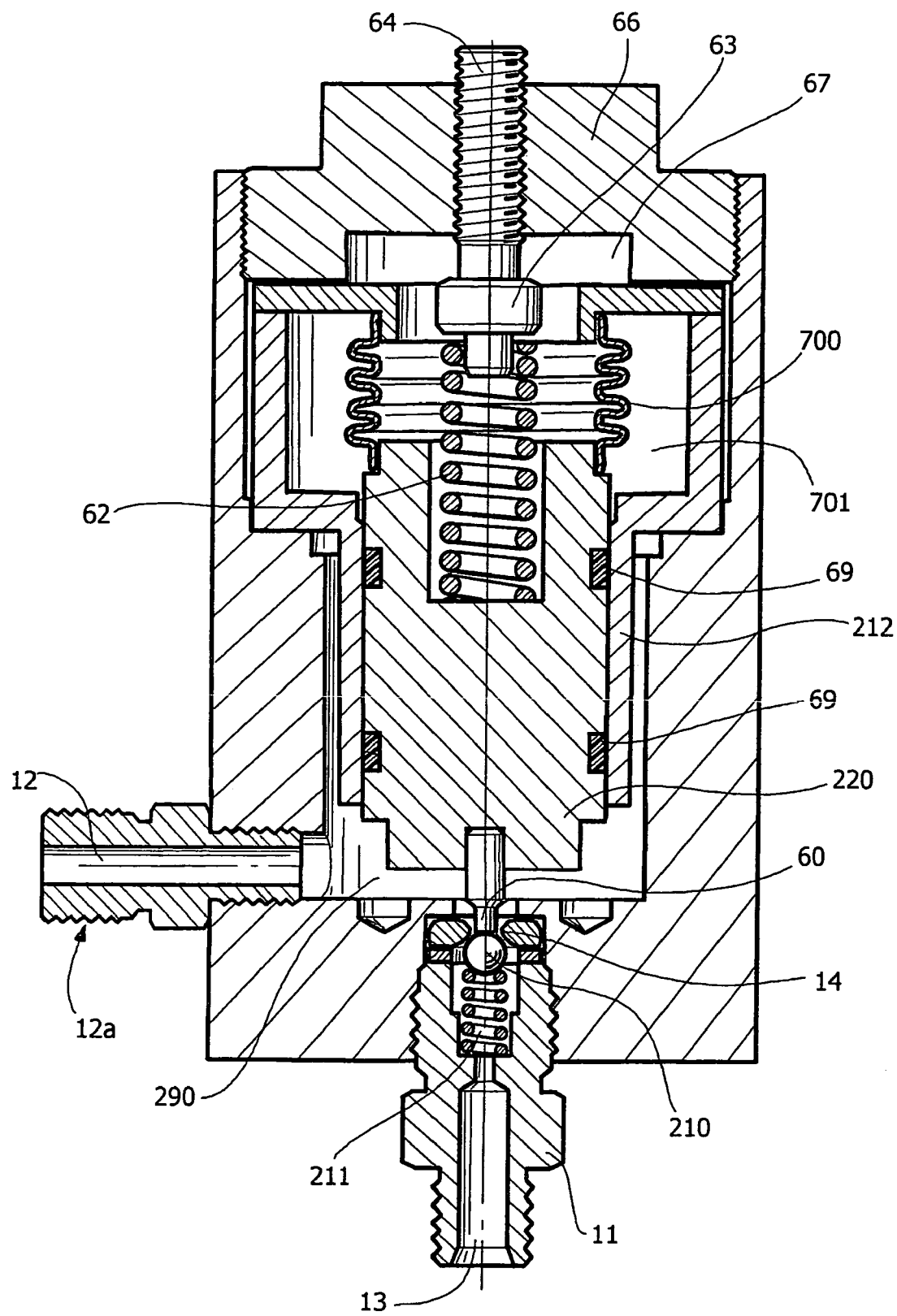
FIG. 4 illustrates a variant of FIG. 3, and does not form part of the invention either.
Figure 8:
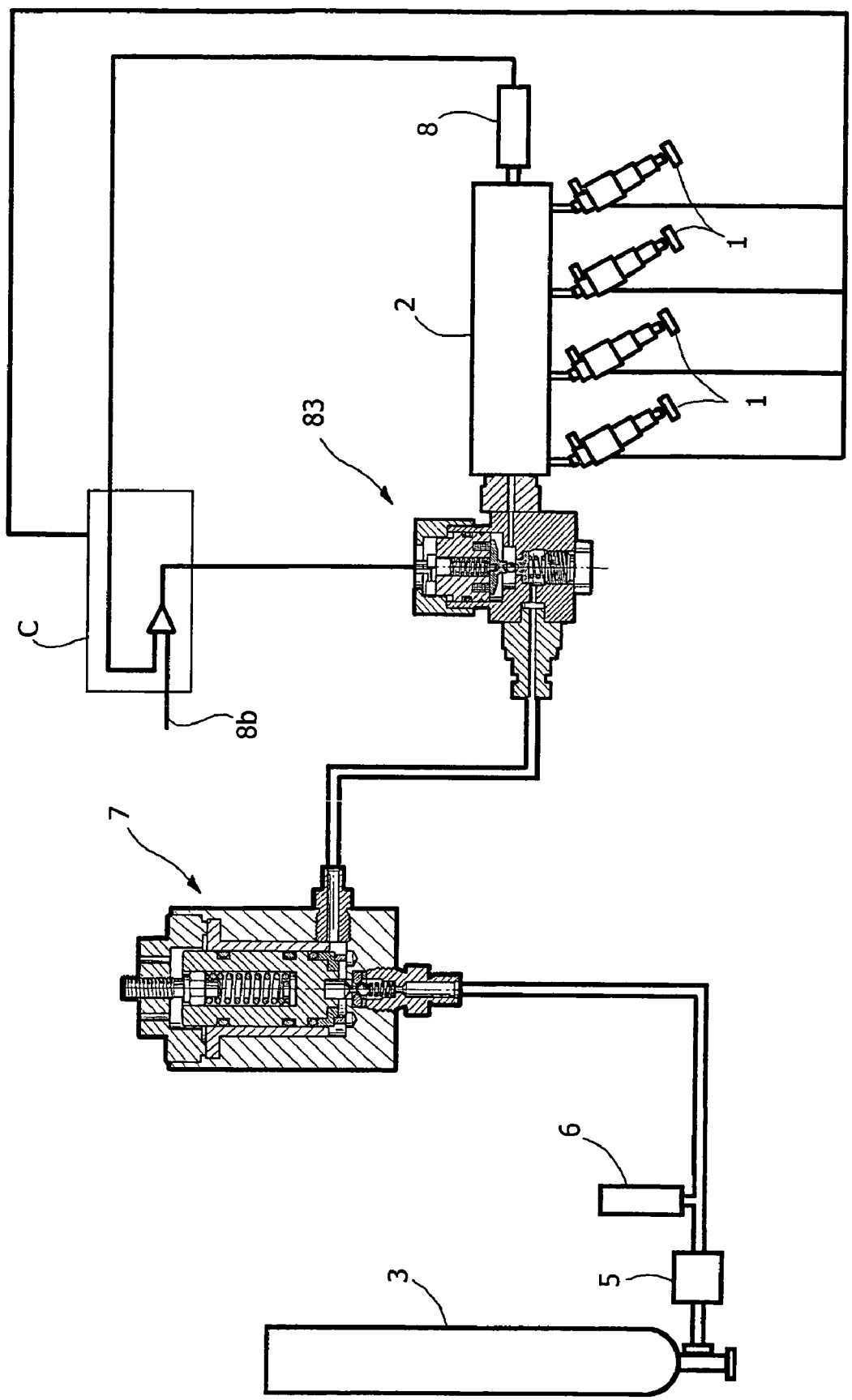
FIG. 8 is a diagram of a supply system according to the present invention.

According to the invention, a supply system is proposed of the type illustrated in FIG. 8, in which the pressure-reducing valve 7 is obtained for example according to what is illustrated in FIG. 3 or in FIG. 4. In what follows the valves of FIGS. 3 and 4 will first of all described, it remaining, however, understood that the system according to the invention can be used also with any other type of pressure-reducing valve, including known valves, such as the valve of FIG. 2.

In FIG. 3, the parts that correspond or have a function similar to those of FIG. 2 are designated by the same reference numbers.

Also the valve of FIG. 3 has a valve body 10, within which a restricted passage 14 is defined, set in communication between an inlet passage 13 made in an inlet connector 11 and an outlet passage 12 made in an outlet connector 12a. The connector 11 is designed to be connected to the pipe 4 (FIG. 1), which carries the gas coming from the reservoir 3. The connector 12a is designed to be connected to the pipe 9 that takes the gas at reduced pressure to the rail 2. The example illustrated in FIG. 3 relates to a single-stage valve that performs a single pressure jump. However, nothing prevents a valve being envisaged which has, in series, two arrangements of the type illustrated in FIG. 3 in order to perform two pressure jumps in succession.

In the case of the example illustrated in FIG. 3, the restricted passage 14 is defined by a ring made of metal or of appropriate plastic material 14a pressed against the end surface of a seat made in the body 10 of the valve by the connector 11, which is screwed inside the body 10. The ring 14a, in addition to defining the restricted passage 14, also defines a conical surface 14b, which functions as valve seat for a ball-type open/close element 210, preferably made of metal material, which is pressed against the valve seat 14b by an auxiliary spring 211 that is set between the ball-type open/close element 210 and a contrast surface defined by the connector 11.

The valve body 10 has an internal cylindrical cavity, within which there is fixed a cylindrical bushing 212 functioning as guide for the sliding movement of a piston member 220. The piston member 220 has a generally cylindrical conformation and has a front end facing a chamber 290 that is set downstream of the restricted passage 14 and that communicates with the outlet passage 12. On the front end, the piston member 220 is provided with a cap 60 to push the ball-type open/close element 210 towards its opening position, against the action of the spring 211 with high flexibility and low pre-load that has the sole function of keeping the ball-type open/close element 210 in position. For this purpose, the body of the piston member 220 has a blind axial hole 61, extending from the top end surface (as viewed in the drawing) of the piston member 220, within which a helical spring 62 is mounted. The helical spring 62 has one end pressed against the end surface of the blind axial hole 61 and the opposite end pressed by a closing element 63 that is withheld in position by means of a threaded grub-screw 64, which is screwed within a threaded hole 65 of a ring nut 66, which is in turn screwed within the end of the valve body 10 opposite to the one on which the inlet connector 13 is mounted. The top end of the piston member 220 faces a chamber 67, defined by the ring nut 66, which communicates with the external atmosphere through holes 68 made in the ring nut.

In the case of the example illustrated, the body of the piston member 220 has two grooves within which are mounted two rings made of a material with a low coefficient of friction, for example PTFE, designated by the reference number 69, for the purpose of guiding and facilitating sliding of the piston member 220 within the guide bushing 212. Furthermore, the piston member 220 is provided with an annular seal gasket of a dynamic type 70, which is pressed between an annular contrast surface defined on the outer surface of the piston member 220 and a ring 71 fixed in any way (for example screwed) on the bottomend of the piston member 220. The ring 213 defines the position of arrest of the piston member 220, and the holes 214 enable in any case communication of the chamber 215, which is in communication with the inlet passage 13, with the chamber 216, which is in communication with the outlet passage 12.

Operation of the pressure-reducing valve described above is illustrated in what follows.

In the resting condition, the spring 62 pushes the open/close element 210 into its opening position, against the action of the spring 211. The gas coming from the reservoir 3 (FIG. 1) reaches the inlet connector 11, and consequently passes through the restricted passage 14 and from there into the chamber 290. From the chamber 290 the gas reaches, through the outlet connector 12 and the pipe 9 (FIG. 1), the rail 2, with a pressure value adequate for proper operation of the injectors 1.

Under the action of the pressure in the chamber 290, however, the piston member 220 is displaced, against the action of the spring 62, in the direction of the opposite chamber 67 (which is at atmospheric pressure) until it enables closing of the open/close element 210 against the valve seat 14b. When the pressure in the chamber 290 drops back to the calibration pressure value, the spring 62 again manages to displace the piston member 220 into the position in which it causes opening of the open/close element 210. In this way, the pressure in the chamber 290 varies cyclically, remaining in any case within a range of reduced values adequate for proper operation of the injectors.

A comparison of the principle of operation of the valve of FIG. 3 with that of the known valve of FIG. 2 shows clearly that a chief difference between said valves lies in the fact that, in the case of the valve according to the invention, the piston member 220 is subject to the pressure of the gas downstream of the restricted passage 14 only in a position corresponding to one of its ends, whereas in the case of the known valve of FIG. 2, said pressure was communicated to both ends of the piston member, and the difference in useful area of said ends was exploited to cause closing of the open/close element as said pressure downstream of the restricted passage increased. Furthermore, in the case of the valve of FIG. 3, the open/close element does not move with the piston member as in the valve of FIG. 2 and is pushed into the opening position by the piston member as a result of a force exerted on the latter by the spring 61. The pressure that is created in the chamber downstream of the restricted passage 14 tends, instead, to push the piston member, acting only on one of its ends, towards a position in which it enables closing of the ball-type open/close element 210.

As a result of the aforesaid geometry, the valve of FIG. 3 consequently does not call for the use of a strongly loaded spring having the cumbersome dimensions of the spring 26 of the valve of FIG. 2, and consequently has a simpler and less voluminous structure and in particular does not call for the use of two seal gaskets of a dynamic type as in the case of the valve of FIG. 2. In order to prevent the risk of leakage of the gas into the external atmosphere, a single seal gasket 70 of a dynamic type is in fact sufficient, in a position corresponding to the surface of sliding contact between the piston member 220 and the corresponding guide bushing 212. It follows that the valve according to the invention, in addition to being simpler and less cumbersome, is also safer as regards the risk of leakages of gas to the outside environment.

A further drawback of the known valve of FIG. 2 that is eliminated in the valve of FIG. 3 consists in the possibility of adopting gaskets that are able to guarantee an efficient operation also with major thermal swings.

FIG. 4 illustrates a valve (which does not form part of the invention either) that is substantially identical to the valve of FIG. 3, with the only difference of presenting, as seal device, instead of the annular seal device 70, the tubular bellows-type boot 700, having one end secured to the fixed body of the valve and the opposite end secured to one end of the piston member, in such a way that the boot 700, with its deformations, is able to follow the movements of the piston member. Said boot separates an annular chamber 701 that surrounds it, within which gas coming from the chamber 290 can leak, from the space inside the boot, which communicates instead with the chamber 67 at atmospheric pressure.

Figure 5:
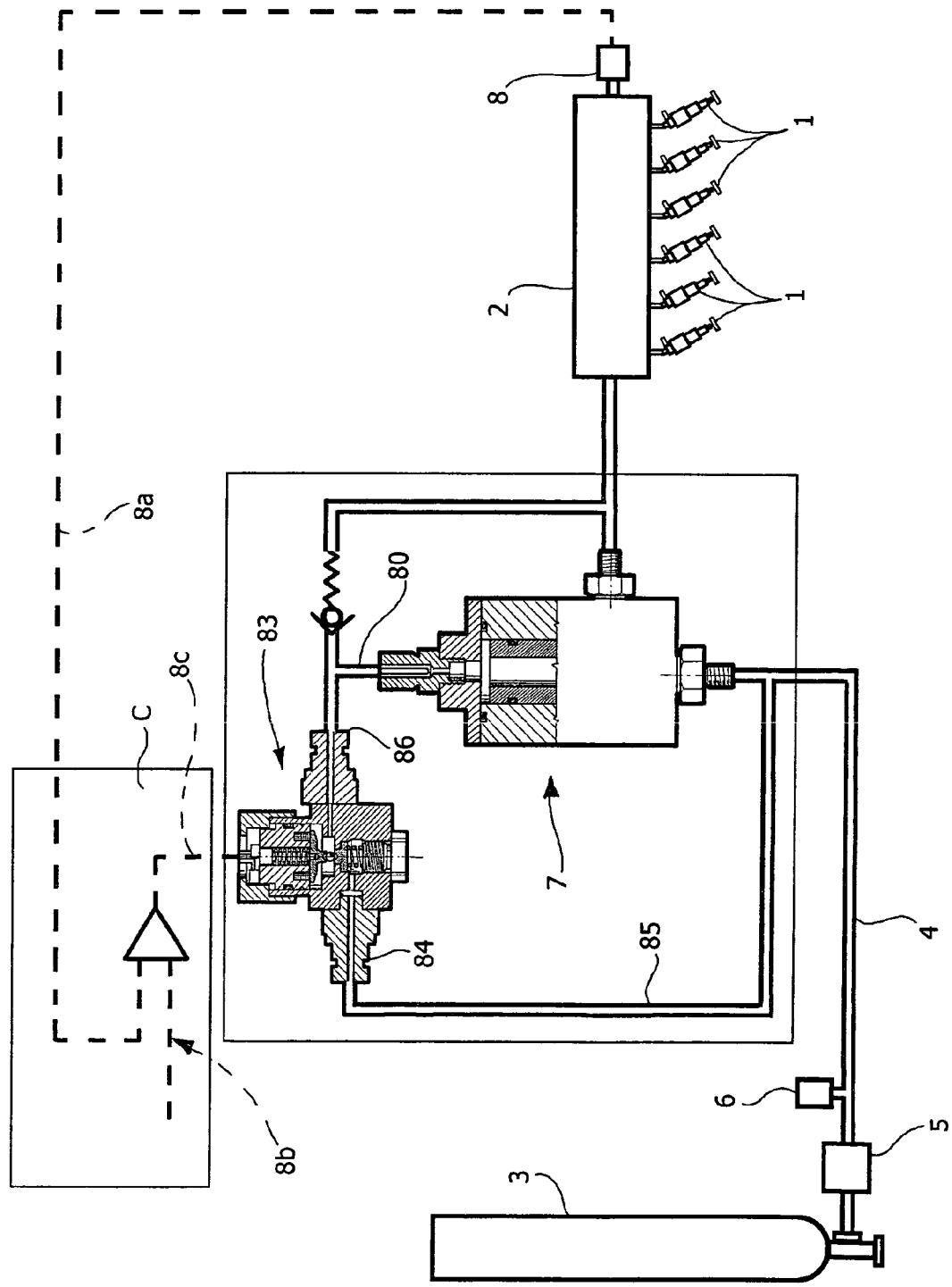
FIG. 5 illustrates a gas-supply system that does not form part of the present invention and that forms the subject of a further co-pending patent application filed in the name of the present applicant.
Figure 6:
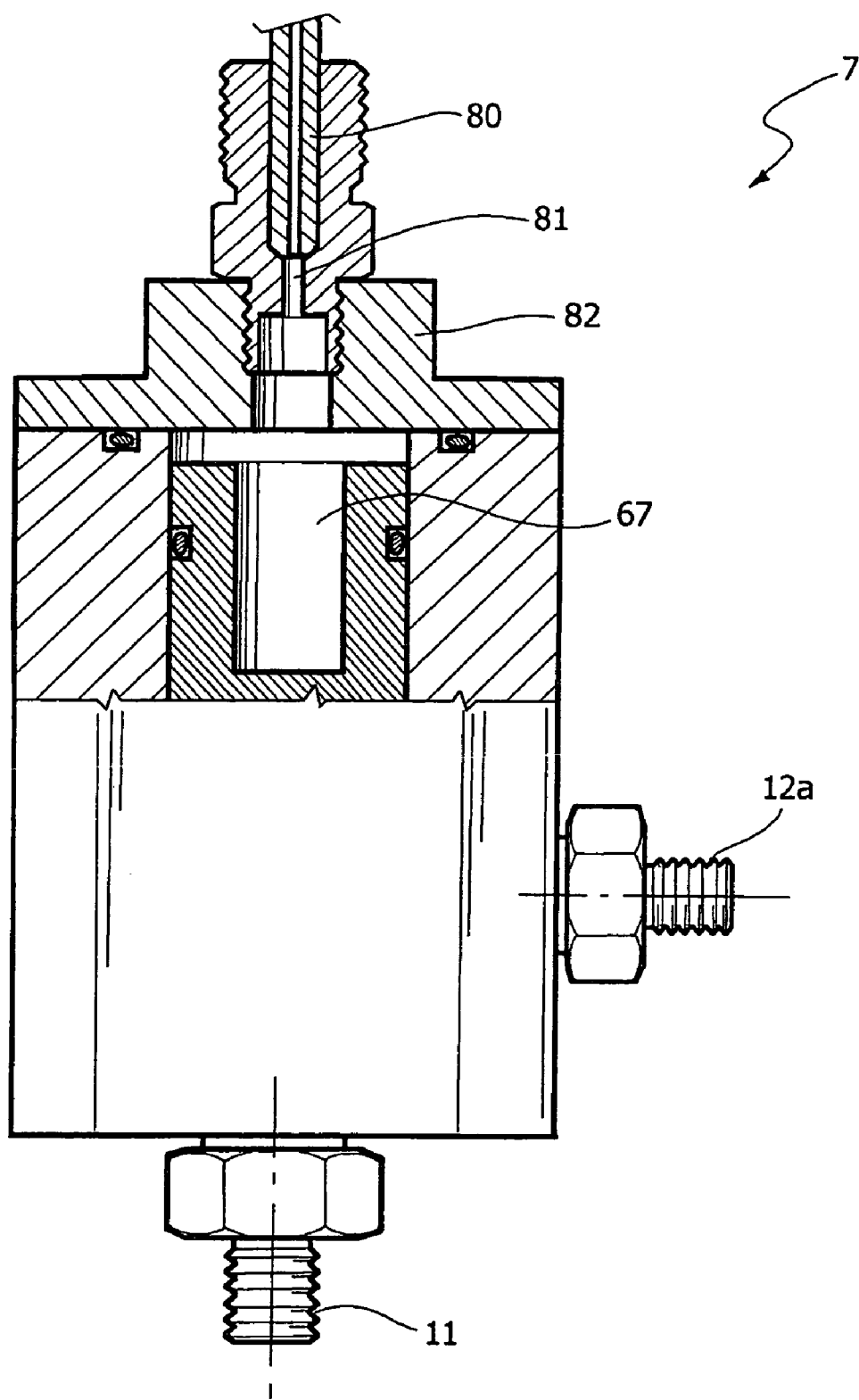
FIG. 6 is a view at an enlarged scale of a first detail of FIG. 5.

FIG. 5 illustrates a supply system that does not form the subject of the present invention, which is described herein in so far as it includes an example of pressure-regulating solenoid valve that can be used also in the system according to the present invention. In said system, the pressure-reducing valve 7 also enables actuation of regulation of the pressure according to desired and pre-set parameters. In this case, the structure of the pressure-reducing valve 7 is, for example, of the type shown at an enlarged scale in FIG. 6. As may be seen, the structure of the valve 7 visible in FIG. 6 is identical to that of the valve of FIG. 3, with the sole difference that the spring 62 is eliminated, and the internal cavity 61 of the piston member 220 is sensitive to a pressure that is applied through a connection line 80 and a passage 81 made in a connector 82.

Figure 7:
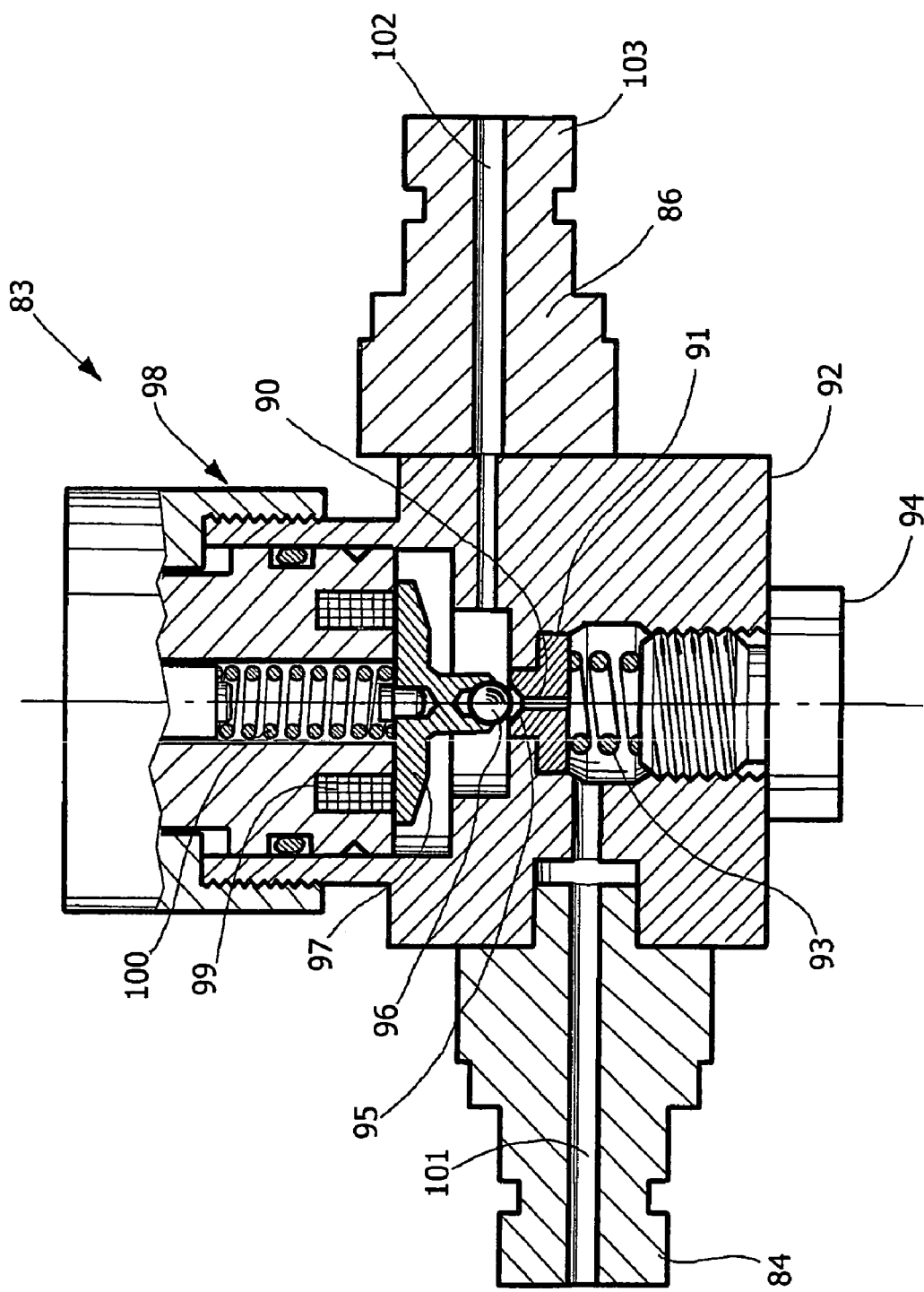
FIG. 7 is a view at an enlarged scale of a second detail of FIG. 5.

As may be seen in the diagram of FIG. 5, the line 80 is set downstream of a further electromagnetically controlled valve 83, which functions as pilot solenoid valve. The detailed structure of the pilot solenoid valve 83 is visible in FIG. 7. Before describing the example of embodiment of said valve that is illustrated in FIG. 7, however, it is important to note that the function of the pilot solenoid valve 83 is to receive, at an inlet connector 84, the pressure of the gas at output from the reservoir 3, which is communicated to the connector 84 via a line 85 derived from the line 4 upstream of the pressure-reducing valve 7. The pilot solenoid valve 83 produces, at an outlet connector 86, a pressure signal reduced with respect to the pressure at the inlet 84, which is sent, via the line 80, to the pressure-reducing valve 7. In practice, whereas in the case of FIG. 3 the piston member 20 was pushed towards the opening position of the open/close element 210 by the force of the spring 62, in the case of the valve of FIG. 6, the piston member 220 is pushed by the pressure signal that arrives through the line 80. Consequently, by varying said pressure signal, it is possible to vary the response of the pressure-reducing valve and hence to vary the pressure jump obtained thereby or, in other words, vary the pressure of the gas that is sent to the rail 2. The pilot pressure that is transmitted through the line 80 to the pressure-reducing valve 7 is varied by the pilot solenoid valve 83 in so far as it depends upon the intensity of the current with which the solenoid of said valve is supplied, as will be illustrated in greater detail with reference to FIG. 7.

To return to the diagram of FIG. 5, the electronic control unit C receives the signal 8a from the pressure sensor 8, indicating the value of the pressure existing in the rail 2 and compares it with a signal 8b indicating the pressure that is desirable within the rail 2 for each operating condition of the engine. For this purpose, to the electronic control unit C there may be associated storage means in which pre-set maps are stored, which supply the desired value or desired range of values of the pressure in the rail 2 as the different operating parameters of the system vary. According to the comparison between the signal 8a and the signal 8b, the electronic control unit C issues an output signal 8c that drives the solenoid valve 83 for the purpose of obtaining, via the pressure-reducing valve 7, the pressure jump each time desired.

Figure 1:
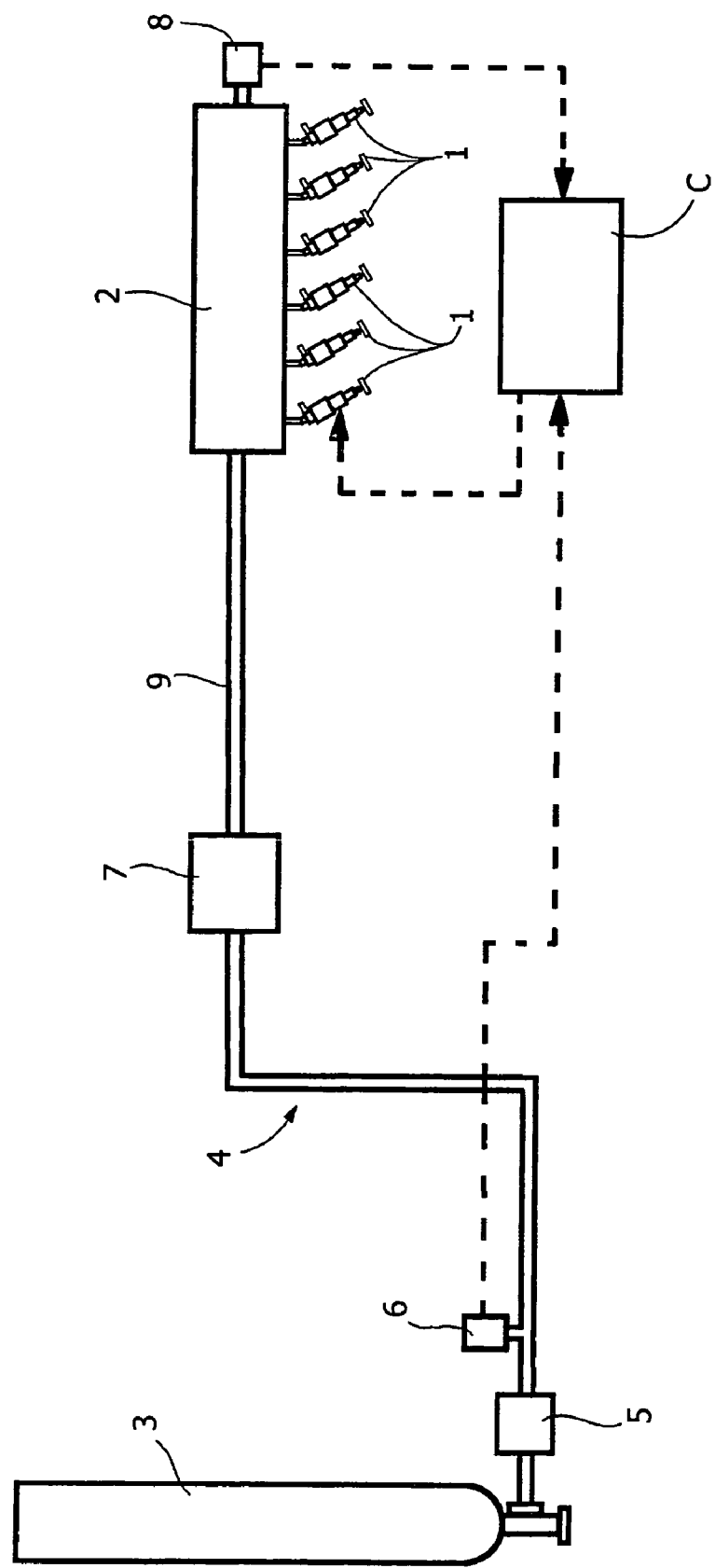
FIG. 1 is a diagram, already described, of a supply system according to the known art.

In the case of the system of FIG. 5, a closed-loop control of the pressure in the distribution rail is consequently implemented (unlike the open-loop control of the system of FIG. 1).

With reference to FIG. 7, the pilot solenoid valve 83 has a restricted passage 90, which is defined by a bushing 91 pushed within a respective seat made in a body 92 of the valve by a helical spring 93 having one end in contact with the bushing 91 and the opposite end in contact with a closing element 94 screwed inside the body 92. The bushing 91 also defines a valve seat 95 for a ball-type open/close element 96, which is connected to an anchor 97 of an electromagnet 98 including a solenoid 99 and a spring 100 that tends to push the open/close element 96 into the closing condition. The gas enters the valve through a passage 101 made in the inlet connector 84, reaches the restricted passage 90, and from there, if the open/close element 96 is open, passes into a chamber communicating with an outlet passage 102 made in an outlet connector 103. As the intensity of current applied to the solenoid 99 varies, the resultant force which acts on the anchor 97 and tends to keep the open/close element 96 in a closed condition varies accordingly. A adjustable pressure jump is thus obtained, which yields at the outlet 102 a reduced pressure with respect to the pressure at the inlet 101, of adjustable value.

Finally, FIG. 8 illustrates a system according to the present invention, which corresponds to a system of the type of FIG. 1, in which, downstream of a pressure-reducing valve 7, for example of the type of FIG. 3 (but any type of valve may be used, including known valves), is set a solenoid valve 83 substantially of the type illustrated in FIG. 7. Hence, in this case, the valve 7 functions simply as a pressure-reducing valve, whilst the function of regulation of the pressure is entrusted directly to the solenoid valve 83, which receives at input the reduced pressure that is supplied at output from the pressure-reducing valve 7 and supplies at output the pressure for supply of the gas to the rail 2. In said application, the pressure-reducing valve 7 reduces the pressure down to values in the region of 15–25 bar, whilst the valve 83, which functions as pressure regulator, guarantees the advantage of a rapid adaptation of the pressure to the desired value. The solenoid of the solenoid valve 83 is controlled by the electronic control unit C according to the pressure value indicated by the sensor 8 and according to the desired value 8b, obtained as a function, on the one hand, of the detection of the various conditions of operation of the engine (position of the accelerator pedal, rate of turning of the engine, environmental temperature, etc.) and, on the other hand, for example as a function of the detection of stored maps, which supply the ideal values of supply pressure for each specific operating condition of the engine. A high speed of actuation and an accurate control of the flow rate is thus obtained. In particular, the opening times of the electro-injectors are thus optimized and hence reduced, which provides the possibility of phasing the injection with the opening of the induction valve of the engine, with beneficial effects on performance and emissions.

Of course, without prejudice to the principle of the invention, the details of construction and the embodiments may vary widely with respect to what is described and illustrated herein purely by way of example, without thereby departing from the scope of the present invention.

What is claimed is:

1. A system for supplying gas to an internal-combustion engine, comprising:

a plurality of electromagnetically controlled injectors, associated to the various cylinders of the engine;

a gas distribution rail communicating with said injectors;

a reservoir for supply of gas to the rail, where pressurized gas is accumulated;

pressure-reducing valve means set in the connection between the reservoir and the rail, for bringing the pressure of the gas supplied to the rail from the value of the gas pressure inside the reservoir to a reduced value, which depends upon the current supplied to a solenoid forming part of said pressure-reducing valve means, wherein the current supplied to said solenoid is controlled by an electronic control unit according to a comparison of the signal issued by a pressure sensor indicating the pressure existing in the rail, with a signal indicating a desired pressure within the rail, wherein the said signal indicating the desired pressure is derived according to the detection of one or more operating parameters of the engine and according to a series of stored maps indicating the pressure value desirable in the various operating conditions of the engine, wherein said pressure-reducing valve means comprise:

a pressure-reducing valve, and a pressure-regulating solenoid valve, including said solenoid, located downstream of said pressure-reducing valve, in the connection between said pressure-reducing valve and said rail, and wherein said pressure-regulating solenoid valve comprises:

a valve body where a restricted passage is defined, which communicates with an inlet passage, which is connected to the outlet of said pressure-reducing valve, to an outlet passage connected to said rail, a valve member cooperating with one end mouth of said restricted passage and carried by one end of an anchor cooperating with said solenoid, and wherein said anchor has its end opposite to the end carrying the valve member which faces one end of the solenoid and is pushed by a spring away from said end of the solenoid and towards said end mouth of said restricted passage.

* * * * *